July 3, 1962
L. BEEMAN
3,042,770
PRESSURE SWITCH
Filed Feb. 3, 1958
2 Sheets-Sheet 1
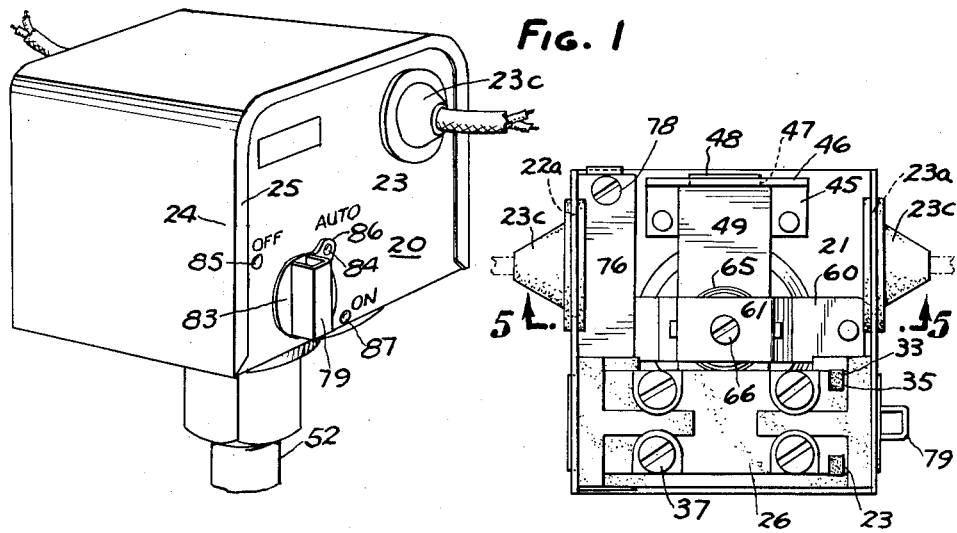
FIG. 1
FIG. 2
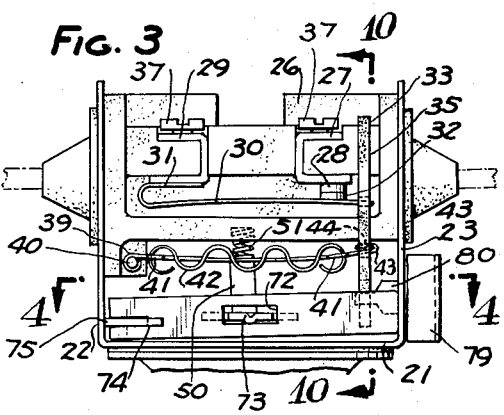
FIG. 3
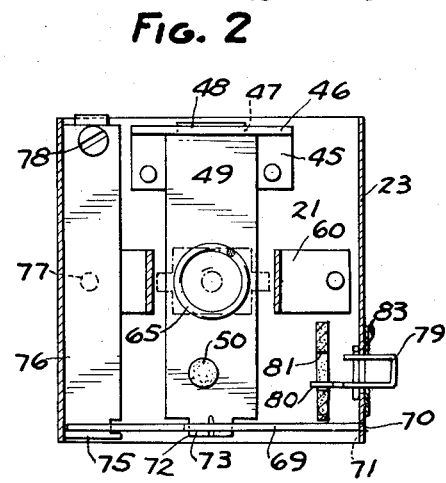
FIG. 4
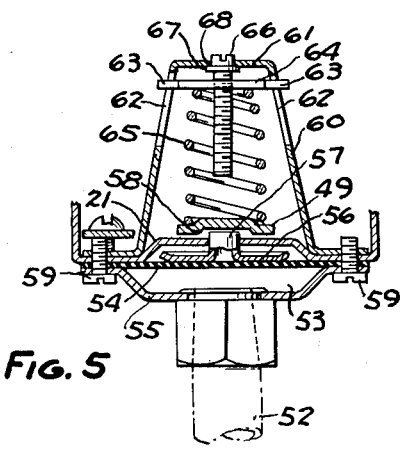
FIG. 5
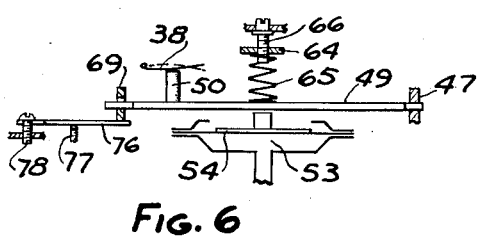
FIG. 6
INVENTOR.
LYLE BEEMAN
BY
Barnes, Kisselle, Raisch & Choate
ATTORNEYS July 3, 1962 L. BEEMAN 3,042,770
PRESSURE SWITCH
Filed Feb. 3, 1958 2 Sheets-Sheet 2

INVENTOR.
LYLE BEEMAN
BY
ATTORNEYS

United States Patent Office 3,042,770
Patented July 3, 1962

3,042,770
PRESSURE SWITCH
Lyle Beeman, 1050 Beaconsfield,
Grosse Pointe Park, Mich.
Filed Feb. 3, 1958, Ser. No. 712,721
20 Claims. (Cl. 200—83)

This invention relates to switches and particularly to switches which are responsive to fluid pressure to make and break electrical connections, such as shown in my prior Patents 2,754,388 and 2,791,658.

It is an object of this invention to provide a pressure switch of improved construction.

It is a further object of this invention to provide a pressure switch having a novel snap action element.

It is a further object of this invention to provide a pressure switch having novel means for adjusting the switch to the fluid pressure at which the switch will close.

It is a further object of this invention to provide a pressure switch having a novel manual controlled means for setting the switch to operate automatically or manually.

It is a further object of this invention to provide a pressure switch which has a long operating life.

It is a further object of this invention to provide a pressure switch which can be made at low cost.

In the drawings:

FIG. 1 is a perspective view of a pressure switch embodying the invention.

FIG. 2 is a plan view of the pressure switch with the cover removed.

FIG. 3 is a fragmentary side elevational view of the switch with the cover removed.

FIG. 4 is a sectional view taken along the line 4—4 in FIG. 3.

FIG. 5 is a fragmentary sectional view taken along the line 5—5 in FIG. 2.

FIG. 6 is a diagrammatic drawing of the operation of the switch.

Figure 7:
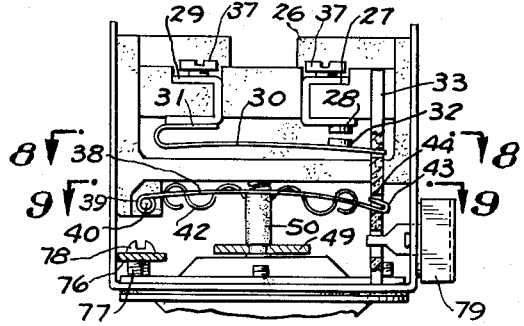
FIG. 7 is a side elevational view of the switch similar to FIG. 3 showing the parts in a different operative position, parts being broken away.
Figure 10:
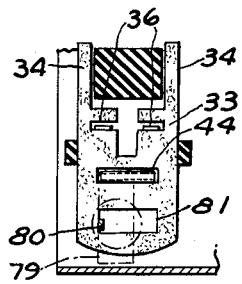
FIG. 10 is a fragmentary sectional view taken along the line 10—10 in FIG. 3.
Figure 8:
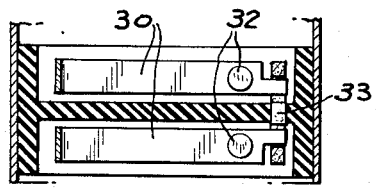
FIG. 8 is a fragmentary sectional view taken along the line 8—8 in FIG. 7.

Referring to FIG. 1, the pressure switch embodying the invention comprises a casing 20 having a base 21 and spaced side walls 22, 23. A U-shaped cover 24 is placed over the casing and includes peripheral flanges 25 which extend inwardly into contact with the outer surfaces of walls 22, 23.

As shown in FIGS. 3 and 7, a block 26 of dielectric material is mounted between walls 22, 23 in spaced relationship to the base 21.

A pair of U-shaped contact button terminals 27 is mounted in block 26, and a contact button 28 is supported on one leg of each terminal 27. A pair of U-shaped contact spring terminals 29 is also mounted in the block 26, and a contact spring 30 is mounted on the lower leg of each of the terminals 29. One end 31 of contact spring 30 is reversely bent and fixed to the terminal 29 and a contact button 32 is supported adjacent its other end. The resiliency of the contact springs 30 tends to maintain contact buttons 32 in contact with contact buttons 28.

A thrust member 33 is mounted for reciprocating movement in block 26. Thrust member 33 is made of flat stock of dielectric material and includes spaced upwardly extending arms 34 which operate in grooves 35 in the block 26 (FIGS. 2 and 3). Thrust member 33 includes openings 36 into which the free ends of contacts springs 30 extend. It can be seen that by this arrangement, if the thrust member is moved downwardly, the contacts 30 are flexed to cause the contact buttons 32 to move out of contact with contact buttons 28, thereby opening the switches. Electric connections may be made to the terminals 27, 29 by wires held in position by screws 37. Wires are inserted through openings 22a, 23a in walls 22, 23 and a rubber grommet 23c is placed in each opening around the wires to keep dirt and other foreign matter from entering the casing and to protect the wires from rubbing against the sides of the openings 22a, 23a.

Figure 9:
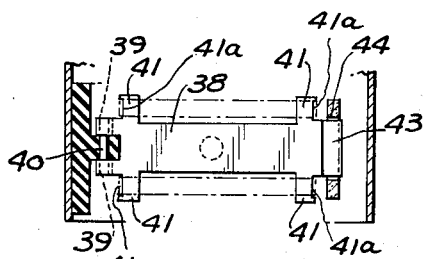
FIG. 9 is a fragmentary sectional view taken along the line 9—9 in FIG. 7.

Referring to FIGS. 3, 7 and 9, a leaf spring 38 has one end thereof bifurcated to form spaced legs 39 which are turned over a pin 40 in the block 26. In this manner the leaf spring is pivoted at one end to the block 26.

The leaf spring 38 includes a pair of laterally extending lugs 41 at longitudinally spaced points along each side edge thereof and lying in the same plane as the spring 38. Tension springs 42 are provided between the lugs on each side of leaf spring 38. Each tension spring 42 comprises a sinuous flat spring element which has the ends thereof looped over the lugs 41 and engaging notches 41a in lugs 41. The lugs 41 are of such a length that each lug contacts the tension spring along its entire width thereby providing a large bearing surface between the lugs 41 and the springs 42. The leaf spring 38 is preferably made of a soft material such as beryllium copper and the tension spring 42 is preferably made of a hard material such as stainless steel. The end of leaf spring 38 opposite pivot pin 40 is bent back on itself as at 43 and projects into an opening 44 in thrust member 33 (FIGS. 3, 7, 9, 10).

As shown in FIG. 4 a bracket 45 having an upstanding lip 46 is fixed to the base 21 of casing 20. Lip 46 is provided with a slot 47 into which the reduced end 48 of a plate 49 extends to thereby pivot the plate relative to the casing. Plate 49 supports a thrust pin 50 of dielectric material which extends upwardly toward the leaf spring 38. A light coil spring 51 is seated in a recess in block 26 and is compressed between the block 26 and leaf spring 38, urging the leaf spring into contact with pin 50.

Plate 49 is moved in response to fluid pressure acting on the switch through a conduit 52 communicating with a chamber 53 formed by a diaphragm 54 and an enclosure 55. A contact button 56 is positioned on the other side of diaphragm 54 and includes a projection 57 extending upwardly through an opening in base 21 and into a recess 58 in the plate 49. The diaphragm enclosure member 55 and diaphragm 54 are held in position by screws 59.

A U-shaped saddle 60 is mounted on the base 21 in inverted position with the base 61 thereof overlying the recess 58 in the plate 49. The legs of the saddle 60 are provided with slots 62 into which the ears 63 of a plate nut 64 project. The ears thereby prevent rotation of the plate nut 64. A heavy coil spring 65 is compressed between the under surface of the plate nut 64 and the upper surface of plate 49, overlying recess 58.

The magnitude of the force exerted by the spring 65 on the plate 49 is varied by means of a bolt 66 threaded into the plate nut 64 and having a peripheral flange 67 engaging the under surface of base 61 and projecting portion 68 extending through an opening in the base 61. By rotating the bolt 66, the position of the plate nut 64 on bolt 66 is adjusted and, in turn, the compression on spring 65 is varied. By controlling the magnitude of the force exerted by spring 65, the pressure at which the switch will be opened may be varied.

Means are provided for varying the pressure at which the switch will close and comprises a bar 69 having one end 70 thereof reduced in cross section and projecting into a slot 71 in wall 23 of casing 20, thereby pivoting the bar to the casing. Bar 69 is provided with an opening 72 intermediate its ends into which the reduced end 73 of plate 49 extends. The width of the opening 72 is greater than the thickness of the end 73 of plate 49 so that some lost motion is permitted between the plate 49 and the bar 69. The other end of the bar 69 is bifurcated by a slot 74 and engages the free end 75 of a flat spring 76. A screw 77 threaded into the base 21 of the casing projects upwardly and forms a fulcrum for the flat spring 76. Another screw 78 extends through an opening in the other end of the flat spring 76 and is threaded into the base 21 of the casing.

When the plate 49 is moved upwardly as shown in FIG. 3, the force exerted on bar 69 by plate 49 is relieved and thereby the bar 69 is permitted to pivot upwardly under the action of flat spring 76. As the pressure is relieved the plate 49 will move downwardly, but the switch will not close until the force exerted by the flat spring 76 on the bar 69 is overcome. By varying the force exerted by the flat spring 76, that is, by rotating screw 78, the pressure at which the spring will close may be adjusted.

Means are provided to set the switch for automatic operation or in an off or on position and comprise a knob 79 rotatably mounted in the side wall 23 of the casing and having a finger 80 of reduced cross-section extending into an opening 81 in thrust member 33 (FIGS. 4, 7 and 10–13). Knob 79 is preferably made of sheet metal bent into a generally U-shaped form so that the finger 80 is eccentric with respect to the axis of rotation of the knob.

Figure 11:
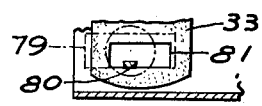
FIGS. 11 and 12 are fragmentary sectional views similar to FIG. 10 showing the parts in a different operative position.
Figure 12:
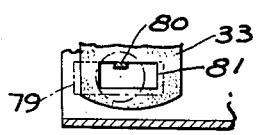
Figure 13:
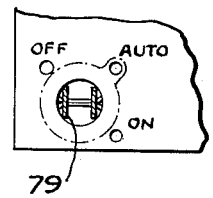
FIG. 13 is a fragmentary front elevational view, parts being broken away.

If the knob 79 is rotated to the position shown in FIGS. 4 and 11, the thrust member is moved downwardly to open the contacts 28, 32. If the knob 79 is turned to the position wherein the finger 80 is opposite to the other side of the opening 81 as shown in FIG. 12, movement of the thrust member downwardly is prevented and the switch contacts 28, 32 are kept in the on position. If the knob 79 is rotated to a position 90° with respect to the two previous positions as shown in FIGS. 3 and 7, the finger 80 permits movement of the thrust member 33 in both directions and the operation of the switch is automatic and under control of the fluid of conduit 52.

A detent is provided to hold the knob in any desired position and comprises a curved disc 83 of resilient material having a projection 84 which engages the recesses 85, 86, 87 in the outer surface of the wall 23 of casing 20. Recesses 85, 86, 87 correspond to the off automatic and on positions of the switch.

The operation of the pressure switch in the automatic position, that is, under the control of the fluid pressure in conduit 52, can best be understood by referring to the drawings, together with the diagrammatic showing in FIG. 6. When the fluid pressure is below the predetermined amount as set by controlling the tension on the spring 65, the contacts 28, 32 are closed, the ends of leaf spring 38 being bowed upwardly, thereby urging thrust member 33 upwardly. When the fluid pressure reaches a predetermined amount, diaphragm 54 is moved upwardly, causing the plate 49, in turn, to move upwardly and flex the leaf spring 38 by means of thrust pin 50. Leaf spring 38 will continue to flex until it passes a dead-center position, after which it will be bowed in a reverse direction by a snap action under the influence of the sinuous springs 42. This will move the thrust member 33 downwardly as shown in FIG. 3 to a position shown in FIG. 7. The movement of the thrust member 33 downwardly will move the free ends of the spring contacts 30 downwardly breaking the contact between the contact buttons 28, 32.

As the pressure in the fluid line 52 decreases, the plate 49 will be permitted to move downwardly under the action of the spring 65. This movement will be independent of the position of bar 69 which will be maintained in its upper position under the action of spring 76 until the free end 73 of the plate moves through the width of opening 72. When the free end 73 contacts the bar 69, the spring 65 acting through the plate 49 must overcome the action of the spring 76 before the bar 49 can move downwardly to permit the leaf spring 38 to flex by a snap action to its originally bowed position. Because of this, the pressure at which the contacts will close depends upon the force exerted on the bar 69 by the flat spring 76.

By providing a wide bearing surface between the lugs 41 on spring 38 and the tension springs 42, excessive wear between the leaf spring 38 and the tension springs 42 is avoided, thus insuring long life for the switch. This long life is further enhanced by the use of a soft material in contact with a hard material.

I claim:
1. In a pressure switch, the combination comprising a casing, a leaf spring having one end thereof pivoted about an axis to said casing and the other end free in such a manner that the entire length of said spring swings about said axis, longitudinally resilient tension means connecting longitudinally spaced points on said leaf spring and acting to longitudinally compress and bow said leaf spring, pressure-responsive means operable on an intermediate portion of said spring to flex the same and thereby cause the same to snap into a reversely bowed position, and switch means connected to the free end of said leaf spring and responsive to the snap action movement thereof.

2. The combination set forth in claim 1 wherein said longitudinally resilient tension means comprises a sinuous flat spring.

3. The combination set forth in claim 2 wherein said leaf spring has longitudinally spaced laterally extending ears, said sinuous flat spring having the ends thereof coiled around said ears.

4. The combination set forth in claim 1 wherein said switch means comprises a member mounted for reciprocating movement in said casing, said member having an opening therein, the free end of said leaf spring projecting into said opening whereby said member is reciprocated by the snap action of said leaf spring.

5. The combination set forth in claim 4 including manual means for locking said reciprocating member in a first position wherein said switch means is energized and in a second position wherein said switch means is deenergized.

6. In a pressure switch, the combination comprising a casing, a leaf spring having one end thereof pivoted to said casing and the other end free, longitudinally resilient tension means connecting longitudinally spaced points on said leaf spring and acting to longitudinally compress and bow said leaf spring, pressure-responsive means operable on an intermediate portion of said spring to flex the same and thereby cause the same to snap into a reversely bowed position, spring means opposing the movement of said pressure-responsive means which tends to reversely bow said leaf spring, means for adjusting said spring means, second spring means acting on said pressure-responsive means and tending to oppose the action of said spring means in reversely bowing said leaf spring, and means for adjusting said second spring means, whereby said first spring means controls the pressure at which said leaf spring is reversely bowed and said second spring means controls the pressure at which said leaf spring is returned to its originally bowed condition.

7. In a pressure switch, the combination comprising a casing, a leaf spring having one end thereof pivotally connected to said casing and the other end free, longitudinally resilient tension means connecting spaced points on said leaf spring and acting to compress and bow said leaf spring, switch means actuated by the movement of the free end of said leaf spring, a movable element mounted in said casing and having a portion thereof engaging an intermediate portion of said leaf spring to flex said spring and cause said spring to snap into a reversely bowed position, said switch means including a member reciprocably mounted in said casing and having an opening therein into which the free end of said leaf spring extends, spring means acting on said movable element and tending to oppose movement of said movable element in a direction for flexing said leaf spring into a reversely bowed position, means for adjusting the force exerted by said spring means, a bar movably mounted in said casing and having an opening therein into which one end of said movable element extends, and a flat spring mounted in said casing and connected to said bar, said spring acting on said bar to oppose the action of said first spring means on said movable element, the opening in said bar being enlarged to provide a lost-motion connection between said movable element and said bar, whereby said first spring means controls the pressure at which said leaf spring is reversely bowed and said flat spring controls the pressure at which said leaf spring returns to its originally bowed condition.

8. The combination set forth in claim 7 including manual control means for locking said reciprocable member in a first position and in a second position.

9. The combination set forth in claim 8 wherein said manual control means includes a knob rotatably mounted in said casing, said reciprocating member having an opening therein, a finger mounted on said knob eccentrically of the axis of rotation and projecting into said opening in said reciprocating member, said finger engaging one side of said opening in one position, thereby preventing reciprocating movement of said member in one direction and engaging an opposite side of said opening in another position thereby preventing reciprocating movement of said member in an opposite direction.

10. In a pressure switch, the combination comprising a casing, a leaf spring having one end thereof pivoted to said casing and the other end free, longitudinally resilient tension means connecting longitudinally spaced points on said leaf spring and acting to longitudinally compress and bow said leaf spring, pressure-responsive means operable on an intermediate portion of said spring to flex the same and thereby cause the same to snap into a reversely bowed position, a member mounted in said casing for reciprocating movement, a switch including a fixed contact and a movable contact, said movable contact being made of spring material and having one end thereof fixed, the other end thereof projecting through an opening in said reciprocating member, whereby said reciprocating member is caused to move under the snap action of said leaf spring to open and close said switch.

11. In a pressure switch, the combination comprising a casing, a block of dielectric material mounted in said casing, a leaf spring having one end thereof pivoted to said block of dielectric material, longitudinally resilient tension means connecting longitudinally spaced points on said leaf spring and acting thereon to longitudinally compress and bow said spring, a flat member of dielectric material mounted for reciprocating movement in said block of dielectric material, said reciprocating member having an opening therein into which the free end of said leaf spring projects, a pair of switches mounted in said block of dielectric material, each said switch including a fixed contact and a movable contact, said movable contact forming a part of a switch leaf spring, said switch leaf spring having one end thereof fixed and the other end thereof extending through an opening in said reciprocating member, a movable element mounted in said casing and having one end thereof pivoted to said casing, said element having a portion thereof engaging an intermediate portion of said leaf spring, movement of said movable element in one direction tending to flex said leaf spring and thereby cause said leaf spring to snap into a reversely bowed position, coil spring means tending to oppose movement of said movable element in a direction to reversely bow said leaf spring, means for adjusting the magnitude of force exerted by said coil spring means, a bar having one end thereof pivoted to said casing, said bar having an opening therein into which the free end of said movable element projects, the size of said opening being such that there is a lost-motion connection between said movable element and said bar, a flat spring mounted in said casing and having one end thereof connected to the free end of said bar, said spring exerting a force on said bar in a direction opposite to that in which said movable element exerts a force on said bar, and means for adjusting the magnitude of said force exerted by said flat spring.

12. The combination set forth in claim 11 wherein said flat spring is fulcrumed about a point intermediate its ends, the end thereof opposite its connection to said bar being adjustably mounted relative to said casing thereby providing the means for adjusting said leaf spring.

13. The combination set forth in claim 11 wherein said leaf spring includes laterally extending lugs on each side of said spring, said longitudinally resilient tension means comprising a sinuous flat spring on each side of said leaf spring, the ends of said sinuous spring being looped over said lugs.

14. The combination set forth in claim 13 wherein said manual control means includes a knob rotatably mounted in said casing, said reciprocating member having an opening therein, a finger mounted on said knob eccentrically of the axis of rotation and projecting into said opening in said reciprocating member, said finger engaging one side of said opening in one position, thereby preventing reciprocating movement of said member in one direction and engaging an opposite side of said opening in another position thereby preventing reciprocating movement of said member in an opposite direction.

15. In a pressure switch, the combination comprising a casing, a leaf spring having one end thereof pivoted about an axis to said casing and the other end free in such a manner that the entire length of said spring swings about said axis, said leaf spring having longitudinally spaced laterally extending ears lying in substantially the same plane as the plane of said leaf spring, a sinuous flat spring having the ends thereof coiled around said ears on said leaf spring thereby acting to longitudinally compress and bow said leaf spring, each said lug contacting said sinuous flat spring substantially throughout the width of said flat spring, pressure-responsive means operable on an intermediate portion of said spring to flex the same and thereby cause the same to snap into a reversely bowed position, and switch means connected to the free end of said leaf spring and responsive to the snap action movement thereof.

16. In a pressure switch, the combination comprising a leaf spring having a pivoted end, and a free end so that said spring is swingable about an axis, said leaf spring having longitudinally spaced laterally extending ears lyng in substantially the same plane as the plane of said leaf spring, a sinuous flat spring having the ends thereof coiled around said ears on said leaf spring thereby acting to longitudinally compress and bow said leaf spring, each said lug contacting said sinuous flat spring substantially throughout the width of said flat spring, pressure-responsive means operable on an intermediate portion of said spring to flex the same and thereby cause the same to snap into a reversely bowed position, and switch means connected to the free end of said leaf spring and responsive to the snap action movement thereof.

17. In a pressure switch, the combination comprising a casing, a block of dielectric material mounted in said casing, a leaf spring having one end thereof pivoted to said block of dielectric material, longitudinally resilient tension means connecting longitudinally spaced points on said leaf spring and acting thereon to longitudinally compress and bow said spring, a flat member of dielectric material mounted for reciprocating movement in said block of dielectric material, said reciprocating member having an opening therein into which the free end of said leaf spring projects, a switch mounted in said block of dielectric material, said switch including a fixed contact and a movable contact, said movable contact forming a part of a switch leaf spring, said switch leaf spring having one end thereof fixed and the other end thereof extending through an opening in said reciprocating member, a movable element mounted in said casing and having one end thereof pivoted to said casing, said element having a portion thereof engaging an intermediate portion of said leaf spring, movement of said movable element in one direction tending to flex said leaf spring and thereby cause said leaf spring to snap into a reversely bowed position, coil spring means tending to oppose movement of said movable element in a direction to reversely bow said leaf spring, means for adjusting the magnitude of force exerted by said coil spring means, a bar having one end thereof pivoted to said casing, said bar having an opening therein into which the free end of said movable element projects, the size of said opening being such that there is a lost-motion connection between said movable element and said bar, a flat spring mounted in said casing and having one end thereof connected to the free end of said bar, said spring exerting a force on said bar in a direction opposite to that in which said movable element exerts a force on said bar, and means for adjusting the magnitude of said force exerted by said flat spring.

18. In a pressure switch, the combination comprising a casing, a leaf spring, longitudinally resilient tension means connecting spaced points on said leaf spring and acting to compress and bow said leaf spring, switch means actuated by the movement of the leaf spring, a movable element mounted in said casing and having a portion thereof engaging an intermediate portion of said leaf spring to flex said spring and cause said spring to snap into a reversely bowed position, spring means acting on said movable element and tending to oppose movement of said movable element in a direction for flexing said leaf spring into a reversely bowed position, means for adjusting the force exerted by said spring means, a bar movably mounted in said casing and having an opening therein into which one end of said movable element extends, and a flat spring mounted in said casing and connected to said bar, said spring acting on said bar to oppose the action of said first spring means on said movable element, the opening in said bar being enlarged to provide a lost-motion connection between said movable element and said bar, whereby said first spring means controls the pressure at which said leaf spring is reversely bowed and said flat spring controls the pressure at which said leaf spring returns to its originally bowed condition.

19. The combination set forth in claim 18 including manual control means for locking said reciprocable member in a first position and in a second position.

20. The combination set forth in claim 19 wherein said manual control means includes a knob rotatably mounted in said casing, said reciprocating member having an opening therein, a finger mounted on said knob eccentrically of the axis of rotation and projecting into said opening in said reciprocating member, said finger engaging one side of said opening in one position, thereby preventing reciprocating movement of said member in one direction and engaging an opposite side of said opening in another position thereby preventing reciprocating movement of said member in an opposite direction.

References Cited in the file of this patent

UNITED STATES PATENTS

| | | |
|---|---|---|
| 2,351,038 | Grooms | June 13, 1944 |
| 2,496,135 | Sedwitz | Jan. 31, 1950 |
| 2,562,437 | Rothwell et al. | July 31, 1951 |
| 2,620,413 | Johnson | Dec. 2, 1952 |
| 2,695,344 | Jacobs | Nov. 23, 1954 |
| 2,729,720 | Jacobs | Jan. 3, 1956 |
| 2,754,388 | Beeman | July 10, 1956 |
| 2,791,658 | Beeman | May 7, 1957 |
| 2,793,268 | Franklin | May 21, 1957 |
| 2,821,587 | Cherry | Jan. 28, 1958 |
| 2,821,588 | Fisher | Jan. 28, 1958 |
| 2,919,321 | Lung | Dec. 29, 1959 |